United States Patent [19]

Taguchi et al.

[11] Patent Number: 4,704,501
[45] Date of Patent: Nov. 3, 1987

[54] POSITION DETECTING DEVICE

[75] Inventors: Yoshinori Taguchi; Tsuguya Yamanami, both of Kuki, Japan

[73] Assignee: Wacom Co., Ltd., Saitama, Japan

[21] Appl. No.: 813,446

[22] Filed: Dec. 26, 1985

[30] Foreign Application Priority Data

Dec. 28, 1984 [JP] Japan .................... 59-278838
Dec. 28, 1984 [JP] Japan .................... 59-278839
Dec. 29, 1984 [JP] Japan .................... 59-199384[U]

[51] Int. Cl.$^4$ ............................................. G08C 21/00
[52] U.S. Cl. .......................................... 178/19; 340/712; 350/331 R
[58] Field of Search ................... 178/18, 19; 340/712, 340/784, 706, 709, 811, 365 VL; 434/408; 350/345, 331 R

[56] References Cited

U.S. PATENT DOCUMENTS 4,603,945 8/1986 Fergason .................. 350/331 R
4,609,776 9/1986 Murakami et al. ................... 178/18

Primary Examiner—Stafford D. Schreyer
Attorney, Agent, or Firm—Pollock, VandeSande & Priddy

[57] ABSTRACT

A position detecting device includes a tablet which has a magnetic sheet and two conductor sheets. The magnetic sheet is formed by weaving a group of warp elements (or weft elements) having multiple insulating fibers and a plurality of relatively long magnetic elements disposed among the fibers at predetermined regular spacings and a group of weft elements (or warp elements) having multiple insulating fibers into a plain weave fabric, which is hardened into a sheet-like configuration. Each of the conductor sheets has a plurality of linear conductor elements extending substantially parallel to each other. The two conductor sheets are respectively overlaid on the upper and lower sides of the magnetic sheet so that the conductor elements and the magnetic elements extend orthogonally with respect to each other. The corresponding conductor elements of the upper and lower conductor sheets are connected to from alternate exciting and detecting lines. The device further includes a driving current source for supplying the exciting lines with a cyclic alternating current designating, a position designating magnetic generator for generating a stationary magnetic field, and a position detecting for calculating, from the voltages respectively induced in the detecting lines, coordinate values of the position designated by the position magnetic generator.

13 Claims, 17 Drawing Figures

F I G. 3
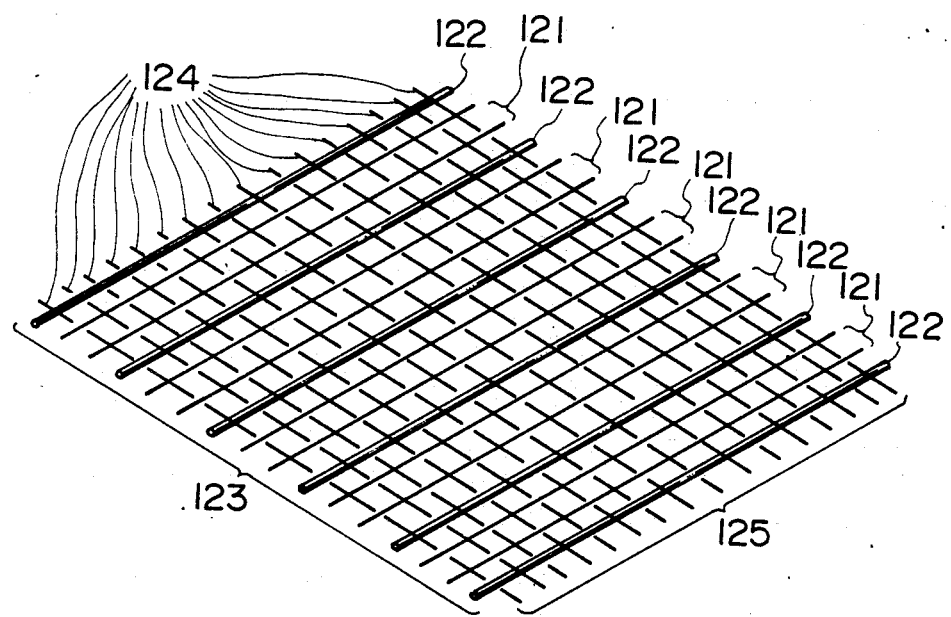

F I G. 13
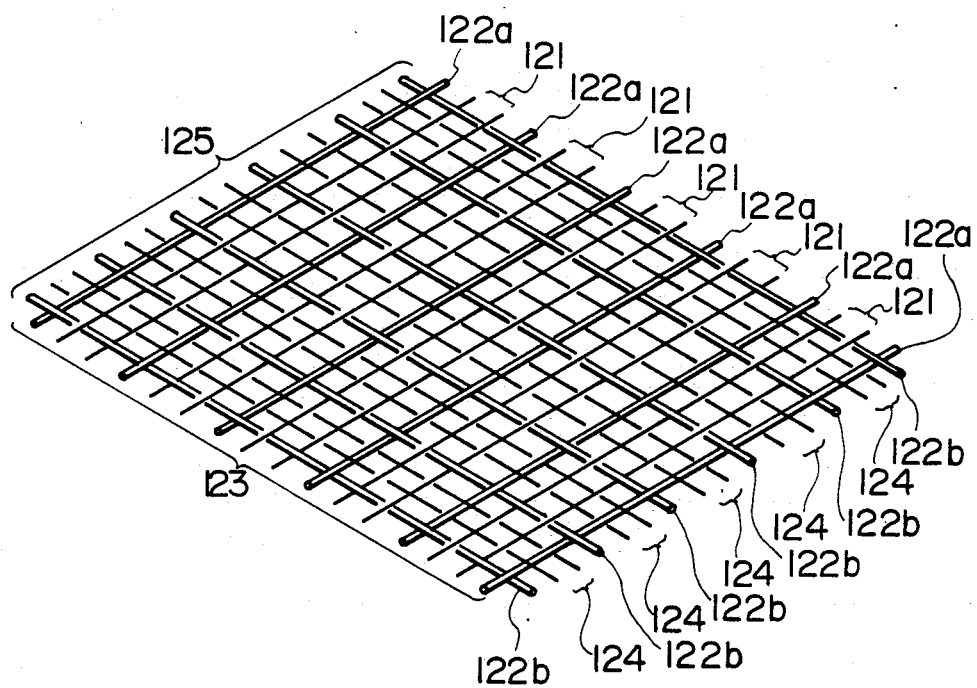

POSITION DETECTING DEVICE

BACKGROUND OF THE INVENTION

1. Field of the Invention

The present invention relates to a position detecting device for detecting a position designated by a position designating magnetic generator on the basis of a change in magnetic permeability of magnetic elements to which a magnetic field is applied by the magnetic generator.

2. Description of the Related Art

A typical conventional position detecting device is arranged such that a driving coil is provided either at one end of a magnetostrictive transmission medium or at the distal end of a position designating pen, while a detecting coil is provided on the other of the two, and a pulsating current is applied to the driving coil so as to cause the transmission medium to generate a magnetostrictive oscillatory wave which in turn causes a voltage corresponding thereto to be induced in the detecting coil. The period of time beginning at the time when the oscillatory wave is generated and ending at the time when the induced voltage is detected is measured by a processor or other similar means, and the position designated by the position designating pen is calculated on the basis of the measured period of time. This device has a relatively high degree of accuracy in position detection, but suffers from the following problems. Namely, since a timing signal and the like are transferred between the pen and the processor or the like, a cord is needed to connect the pen and the device, which remarkably limits the range within which the pen can be handled. In addition, the cord is easily affected by induction caused by external devices, which leads to an erroneous operation and also involves a risk of the cord becoming a noise generating source. Further, the conventional device requires the pen to be held perpendicular with respect to the plane of the magnetostrictive transmission medium and in close proximity with the surface of the transmission medium when a position is designated using the pen.

There is another conventional position detecting device wherein a plurality of driving lines and a plurality of detecting lines are disposed orthogonally with respect to each other, and the driving lines are successively supplied with a current, while the detecting lines are successively selected in order to detect voltages induced therein, whereby a position designated by a position designating pen having a magnetic material such as ferrite is detected from the position of the detecting line having a relatively large induced voltage. This device enables the position designating pen to be cordless, but still suffers from the following problems. Namely, the resolution of coordinate positions is determined by the distance between each pair of adjacent lines, and if this distance is reduced in order to improve the resolution, then SN ratio and stability deteriorate. For this reason, it is difficult to improve the resolution. It is also difficult to detect the positions directly above the intersections between the driving and detecting lines. Further, the pen needs to be brought in close proximity with the lines, which makes it impossible to place a thick member on the input surface when the pen is used.

SUMMARY OF THE INVENTION

It is a first object of the present invention to provide a position detecting device including a tablet which has a magnetic sheet formed by weaving a group of warp elements (or weft elements) composed of a multiplicity of insulating fibers and a plurality of relatively long magnetic elements disposed among the insulating fibers at predetermined regular spacings and a group of weft elements (or warp elements) composed of a multiplicity of insulating fibers into a plain weave fabric, and hardening this fabric into a sheet-like configuration by means of an insulating resin, and two conductor sheets each having a plurality of linear conductor elements formed thereon so as to extend substantially parallel to each other, the two conductor sheets being respectively overlaid on the upper and lower sides of the magnetic sheet so that the conductor elements and the magnetic elements extend orthogonally with respect to each other, and the corresponding conductor elements of the upper and lower conductor sheets being connected to each other, thereby alternately forming exciting lines and detecting lines. By virtue of the above arrangement, it is possible to reduce the thickness of the magnetic sheet by a large margin, so that the thickness of the tablet can be reduced as a whole. In addition, the tablet can readily be massproduced. Further, changes in magnetic flux between the exciting and detecting lines take place only within the magnetic elements, and their close connection provides a large detected voltage and good SN ratio. Further, this device is not likely to be affected by induction caused by external devices or to cause noise to be induced in external devices. Since a position can be designated by applying only a small bias magnetic field to the magnetic elements, it is not necessary to bring a position designating magnetic generator in close proximity with the magnetic elements, and the effective read value can be increased. In addition to the advantage that the thickness of the tablet can be reduced, it is possible to designate a position from the reverse side of the tablet, and the tablet can be interposed between metal sheets other than ferromagnetic materials. Further, since it is not necessary to transfer a timing signal and the like between the position designating magnetic generator and a processor or other similar means, the magnetic generator can be made cordless, which makes it possible to greatly improve the operability.

It is a second object of the present invention to provide a position detecting device including a tablet which has two magnetic sheets each formed by weaving a group of warp elements (or weft elements) composed of a multiplicity of insulating fibers and a plurality of relatively long magnetic elements disposed among the insulating fibers at predetermined regular spacings and a group of weft elements (or warp elements) composed of a multiplicity of insulating fibers. The resulting plain weave fabric is hardened into a sheet-like configuration by means of an insulating resin. Four conductor sheets are employed. Each includes linear conductor elements formed thereon so as to extend substantially parallel to each other. The two magnetic sheets are disposed such that the magnetic elements of one of them extend in a direction X, while the magnetic elements of the other extend in a direction Y, two of the four conductor sheets being respectively disposed on the upper and lower sides of the magnetic sheet, the magnetic elements of which extend in the X-direction so that the respective conductor elements thereof extend orthogonally with respect to the X-direction. The other two of the four conductor sheets are respectively disposed on the upper and lower sides of the magnetic sheet, the magnetic elements of which extend in the Y-direction so that the respective conductor elements thereof extend orthogonally with respect to the Y-direction, and the corresponding conductor elements, extending in the same direction, of each pair of upper and lower conductor sheets being connected together, thereby alternately forming exciting lines and detecting lines for the X-direction and those for the Y-direction. According to this device, it is possible to effect two-dimensional position detection, in addition to the various advantages mentioned in the description of the first object of the present invention.

It is a third object of the present invention to provide a position detecting device including a tablet which has a magnetic sheet formed by weaving a group of warp elements (or weft elements) composed of a multiplicity of insulating fibers and a plurality of relatively long magnetic elements disposed among the insulating fibers at predetermined regular spacings and a group of weft elements (or warp elements) having an arrangement similar to that of the group of warp elements (or weft elements) into a plain weave fabric. This fabric is hardened into a sheet-like configuration by means of an insulating resin. The tablet further including and four conductor sheets each having a plurality of linear conductor elements formed thereon so as to extend substantially parallel to each other, the magnetic sheet being disposed such that the magnetic elements in either the group of warp elements or the group of weft elements extend in a direction X, while those in the other of the two extend in a direction Y, the four conductor sheets being laid on the upper and lower sides of the magnetic sheet in pairs, respectively. The conductor elements of one of each pair of conductor sheets extend in the X-direction, while the conductor elements of the other extend in the Y-direction, and the corresponding conductor elements of the conductor sheets which extend in the same direction are connected together, thereby alternately forming exciting lines and detecting lines for the X-direction and those for the Y-direction. By virtue of the above arrangement, the thickness of the tablet can be further reduced, in addition to the various advantages mentioned in the description of the first and second objects of the present invention.

It is a fourth object of the present invention to provide, in a position detecting device for detecting a position on a tablet which is designated by a position designating magnetic generator which generates a stationary magnetic field, a coordinate input device with a display which includes a back light and a liquid-crystal display which are laid on the tablet through a shielding plate made of a non-magnetic metal. According to this device, it is possible to reduce the thickness of an input-/output panel, input any desired character or figure with high accuracy simply by operating the position designating magnetic generator (input pen) on the liquid-crystal display, and permit the results of input to be immediately checked on the display. The back light enables a clear display to be obtained even when the surrounding area is relatively dark. Further, the shielding plate can shut off any noise, and this prevents lowering of the degree of accuracy in position detection. Since the display is laid on the tablet, the device is free from the disadvantage of having a displayed character or figure seen in double by parallax. The device is not likely to be affected by induction caused by external devices or to cause noise to be induced in external devices. Further, since a position can be designated by applying only a small bias magnetic field to the magnetic elements, it is not necessary to bring the magnetic generator in close proximity with the magnetic elements. It is therefore possible to increase the effective read value. It is also possible to interpose the tablet between metal sheets other than ferromagnetic materials. In addition, since it is not necessary to transfer a timing signal and the like between the position designating magnetic generator and a processor or other similar means, the magnetic generator can be made cordless, which makes it possible to greatly improve the operability of inputting coordinates.

The above and other objects, features and advantages of the present invention will become clear from the following description of the preferred embodiments thereof, taken in conjunction with the accompanying drawings.

BRIEF DESCRIPTION OF THE DRAWINGS

The accompanying drawings show in combination the present invention, in which:

FIG. 3 shows the way in which each of the magnetic sheets in the first embodiment is produced;

FIG. 13 shows the way in which each of the magnetic sheets in accordance with the second embodiment is produced;

DESCRIPTION OF THE PREFERRED EMBODIMENTS

Figure 1:
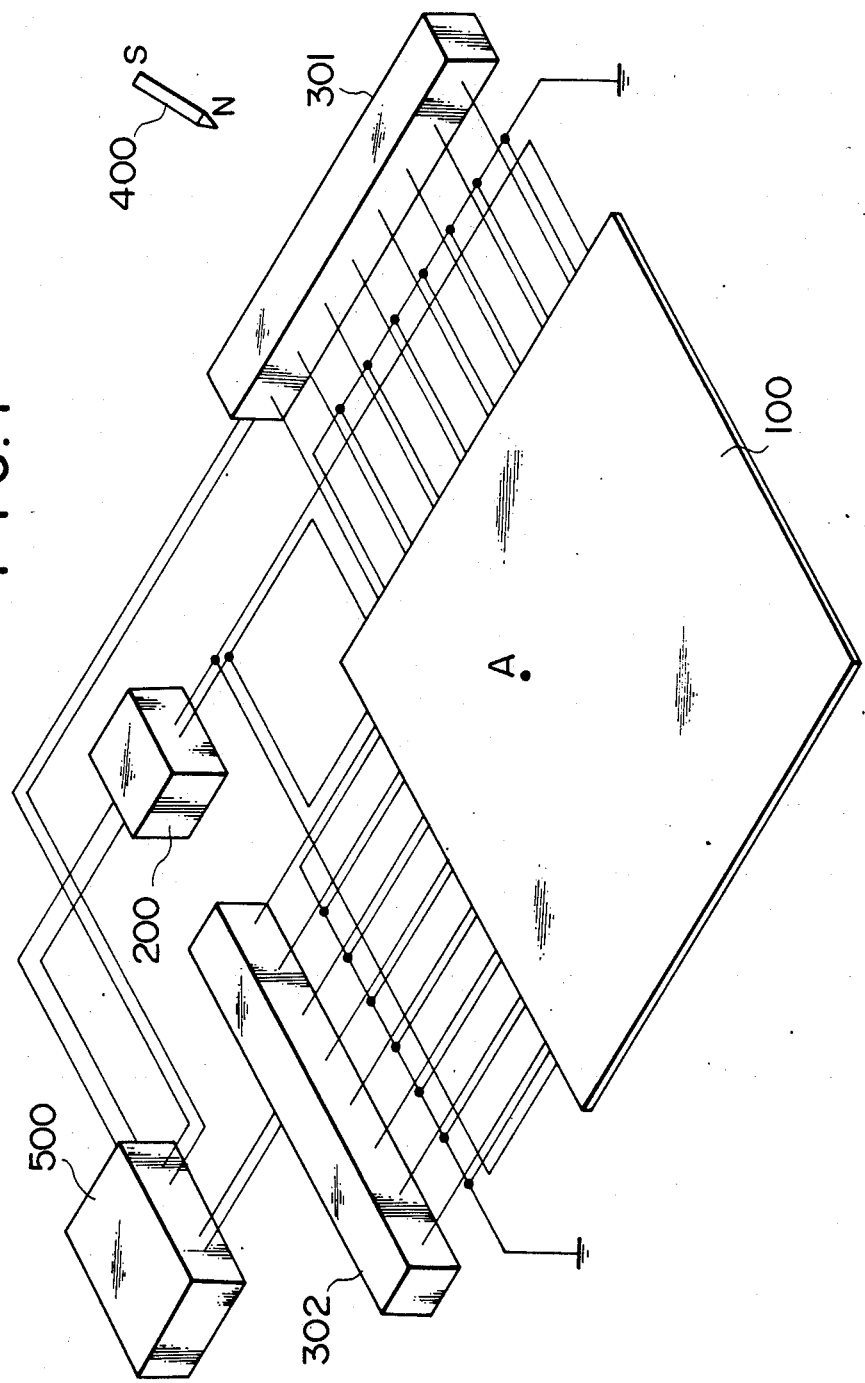
FIG. 1 is a fragmentary exploded perspective view of a first embodiment of the present invention.

Referring first to FIG. 1 which is a fragmentary exploded perspective view of a first embodiment of the present invention, the reference numeral 100 denotes a tablet, 200 a driving current source, 301, and 302 multiplexers, 400 a position designating magnetic generator, e.g., a bar magnet, and 500 a position detecting circuit.

Figure 2:
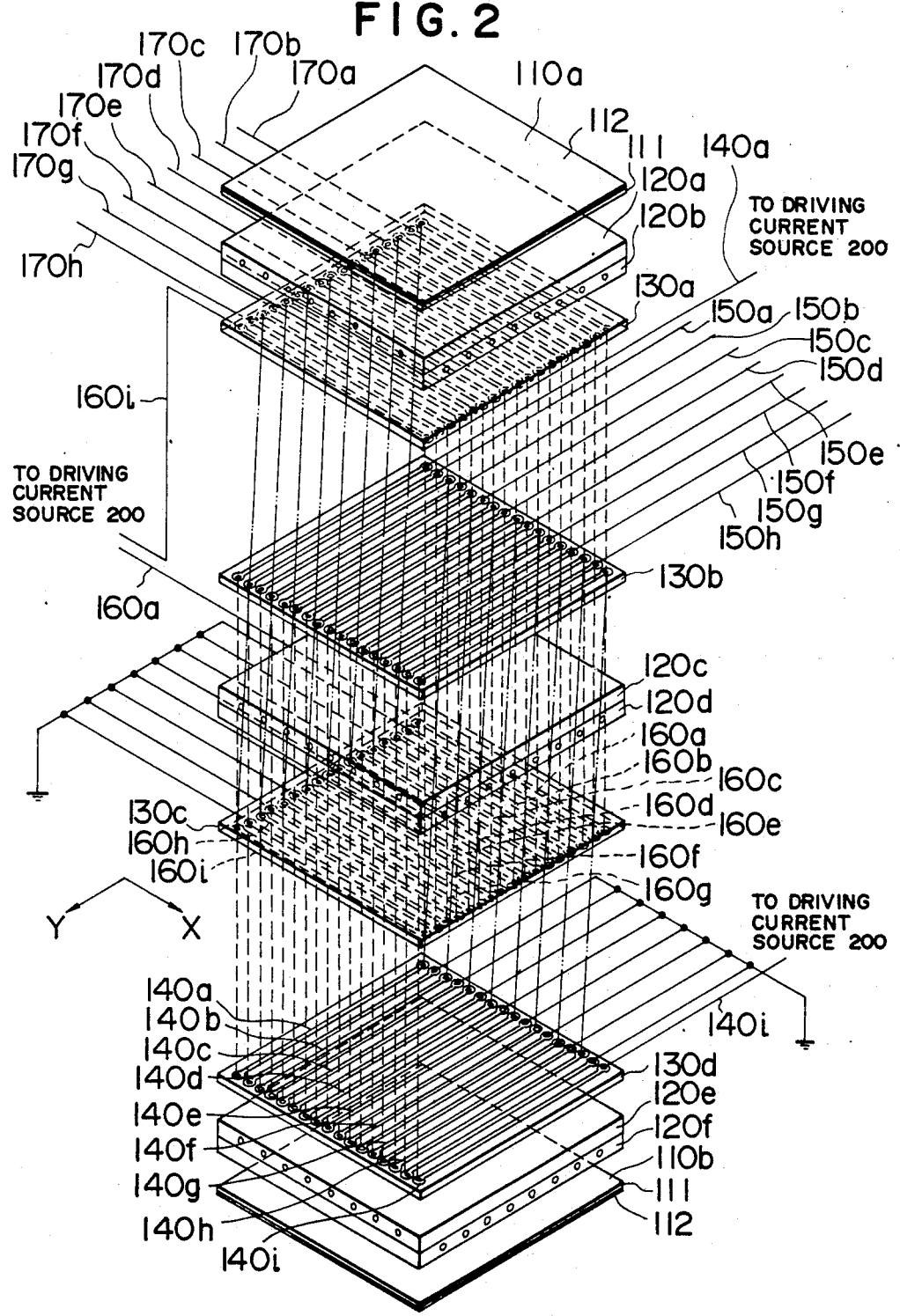
FIG. 2 shows a practical structure of the tablet in the first embodiment.

The tablet 100 is, as shown in FIG. 2, composed of twelve layers which are respectively constituted by a shielding sheet 110a magnetic sheets 120a, 120b, conductor sheets 130a, 130b, magnetic sheets 120c, 120d, conductor sheets 130c, 130d, magnetic sheets 120e, 120f, and a shielding sheet 110b, these layers being disposed in that order from the upper side to the lower side thereof.

Each of the shielding sheets 110a and 110b is constituted by a printed board formed by bonding a non-magnetic metal sheet, e.g., a copper sheet 112, to one surface of an insulating substrate 111 made of, for example, a glass epoxy resin.

Each of the magnetic sheets 120a to 120f is, as shown in FIG. 3, formed by weaving a group of warp elements (or weft elements) 123 and a group of weft elements (or warp elements) 125 into a plain weave fabric, and hardening this fabric into a sheet-like configuration by means of an insulating resin such as an epoxy resin. The group of warp elements (or weft elements) 123 consists of a multiplicity of insulating fibers 121 disposed such as to extend substantially parallel to each other, and a plurality of relatively long magnetic elements 122 disposed among the insulating fibers 121 at predetermined regular spacings, while the group of weft elements (or warp elements) 125 consists of a multiplicity of insulating fibers 124. The insulating fibers 121 and 124, may for example, be glass fibers may. Each of the magnetic elements 122 is preferably made of a material which is only magnetized very slightly by any magnet brought close to it, that is, a material which has small retentiveness and high magnetic permeability ($\mu$), e.g., an amorphous alloy wire having a circular cross-section and a diameter of about 0.1 mm. As an amorphous alloy wire, it is appropriate to employ, for example, $(Fe_{1-x}Co_x)_{77.5}Si_{10}B_{15}$ (atomic %) (x represents the ratio between Fe and Co and takes a value between 0 and 1). It is to be noted that although the fibers and the magnetic elements shown in FIG. 3 are drawn in such a manner that they are spaced apart from those adjacent thereto, they are arranged without any gap therebetween in practice. Further, although two fibers are disposed between each pair of adjacent magnetic elements in the example shown in FIG. 3, a number of fibers required for maintaining a predetermined spacing between each pair of adjacent magnetic elements is disposed in practice.

Figure 4:
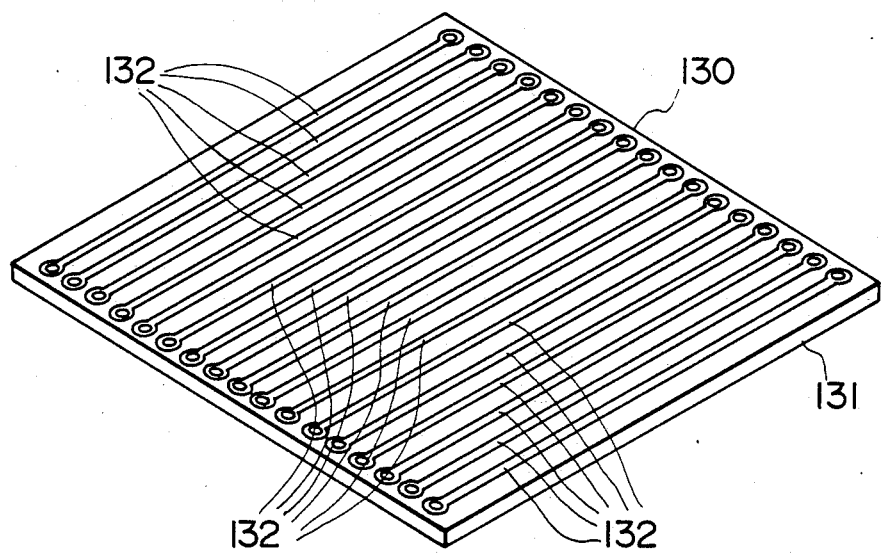
FIG. 4 is a perspective view of one of the conductor sheets in the first embodiment.

Each of the conductor sheets 130a to 130d is, as shown in FIG. 4, constituted by a printed board 131 formed by bonding a copper sheet to one surface of an insulating substrate made of, for example a glass epoxy resin, the printed board 131 being subjected to etching so as to form a plurality (seventeen, in the illustrated example) of linear conductor elements 132 each having land holes respectively provided at both ends thereof.

Each pair of adjacent magnetic sheets 120a and 120b, 120c and 120d, and 120e and 120f is rigidly bonded together by means of heat contact bonding or an adhesive sheet, while each pair of other adjacent sheets is rigidly bonded together by means of an adhesive sheet. At this time, the magnetic elements 122 of the magnetic sheets 120a, 120c and 120e are disposed such as to extend in a direction Y, while the magnetic elements 122 of the magnetic sheets 120b, 120d and 120f are disposed such as to extend in a direction X. The conductor elements of the conductor sheets 130a and 130c are disposed such as to extend in a direction orthogonal to the Y-direction, while the conductor elements of the conductor sheets 130b and 130d are disposed such as to extend in a direction orthogonal to the X-direction.

Another tablet-manufacturing method may be employed wherein two adjacent magnetic sheets are bonded together by, for example, heat contact bonding such that their respective magnetic elements extend orthogonally to each other, and printed boards are respectively bonded to the outer sides of the two magnetic sheets. Thereafter, conductor elements are formed on the printed boards by etching, thereby producing a set of the conductor sheet 130b, the magnetic sheets 120c, 120d and the conductor sheet 130c, conductor elements are formed on only one of the two printed boards by etching, thereby producing a set of the shielding sheet 110a, the magnetic sheets 120a, 120b and the conductor sheet 130a, and a set of the conductor sheet 130d, the magnetic sheets 120e, 120f and the shielding sheet 110b. Then, these sets are bonded together. Although the overall thickness of the tablet 100 is practically 2 to 4 mm, the tablet 100 shown in FIGS. 2 to 4 is drawn in such a manner that it is enlarged only in the direction of thickness.

The conductor sheets 130b and 130d are disposed such that the conductor elements of the sheet 130b and those of the sheet 130d respectively coincide with each other vertically, and each pair of corresponding conductor elements is connected together at the land holes each provided at one end of each conductor element by means of through-hole contact, thereby alternately forming exciting lines 140a to 140i and detecting lines 150a to 150h for the X-direction which wind around the magnetic elements 122 in the magnetic sheet 120d. The other end of each of the exciting lines 140a to 140i on the conductor sheet 130b is connected to the other end of the adjacent one of the exciting lines 140a to 140i on the conductor sheet 130d, that is, the exciting lines 140a to 140i are connected in series. The other or second end of the exciting line 140a and that of the exciting line 140i are connected to the driving current source 200. The other end of each of the detecting lines 150a to 150h on the conductor sheet 130b is connected to the multiplexer 301, while the other end of each of the detecting lines 150a to 150h on the conductor sheet 130d is grounded.

The conductor sheets 130a and 130c are disposed such that the conductor elements of the sheet 130a and those of the sheet 130c respectively coincide with each other vertically, and each pair of corresponding conductor elements is connected together at the land holes each provided at one end of each conductor element by means of through-hole contact, thereby alternately forming exciting lines 160a to 160i and detecting lines 170a to 170h for the Y-direction which wind around the magnetic elements 122 in the magnetic sheet 120c. The other end of each of the exciting lines 160a to 160i on the conductor sheet 130a is connected to the other end of the adjacent one of the exciting lines 160a to 160i on the conductor sheet 130c that is, the exciting lines 160a to 160i are connected in series. The other or second end of the exciting line 160a and that of the exciting line 160i are connected to the driving current source 200. The other end of each of the detecting lines 170a to 170h on the conductor sheet 130a is connected to the multiplexer 302, while the other end of each of the detecting lines 170a to 170h on the conductor sheet 130c is grounded.

The driving current source 200 constantly supplies the exciting lines 140a to 140i and 160a to 160i with an alternating current of a predetermined cycle (e.g., a sine-wave alternating current). The multiplexers 301 and 302 selectively deliver the output signals from the detecting lines 150a to 150h and 170a to 170h to the position detecting circuit 500 in accordance with a control signal from the circuit 500.

Figure 5:
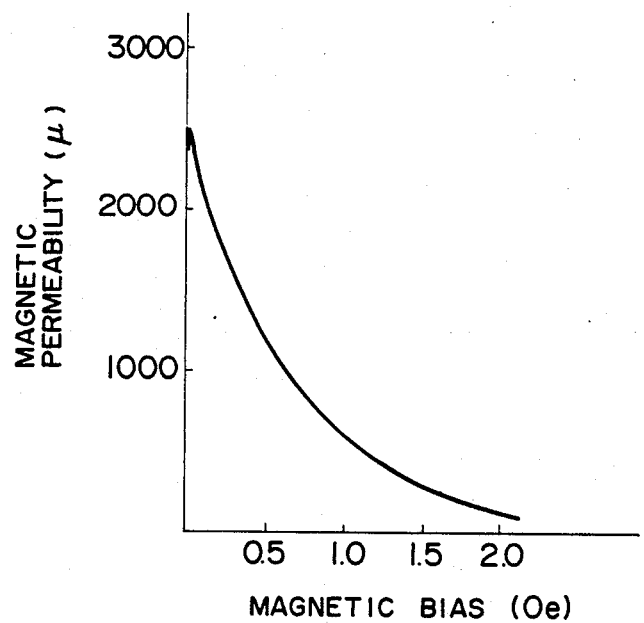
FIG. 5 is a characteristic chart showing the relationship between magnetic bias and magnetic permeability.

In the above arrangement, the detecting lines 150a to 150h and 170a to 170h have an induced voltage produced therein by electromagnetic induction caused by the alternating current flowing through the exciting lines 140a to 140i and 160a to 160i. Since this electromagnetic induction takes place through the magnetic elements 122 in the magnetic sheets 120a to 120f, the larger the magnetic permeability of the magnetic elements 122, the larger the value of the induced voltage. The magnetic permeability of the magnetic elements 122 greatly varies in accordance with the magnitude of the magnetic bias externally applied thereto. The degree by which the magnetic permeability changes differs depends upon the composition of the magnetic material employed for the magnetic elements 122, the frequency of the above-described alternating current, and whether or not a heat treatment is applied to the magnetic material. It is therefore possible to set the magnetic permeability so that it reaches its maximum when a predetermined magnetic bias is applied, as shown in FIG. 5. Accordingly, the application of a predetermined magnetic bias to the magnetic elements 122 in this case increases the voltage induced in the detecting lines 150a to 150h and 170a to 170h by the alternating current flowing through the exciting lines 140a to 140i and 160a to 160i.

It is now assumed that, in FIG. 1, the position designating bar magnet 400 with its N pole directed downward is at a position A on the tablet 100 which is a distance $x_s$ away from the detecting line 150a in the X-direction and which is a distance $y_s$ away from the detecting line 170a in the Y-direction. The bar magnet 400 applies the predetermined magnetic bias to the magnetic elements 122.

Figure 6:
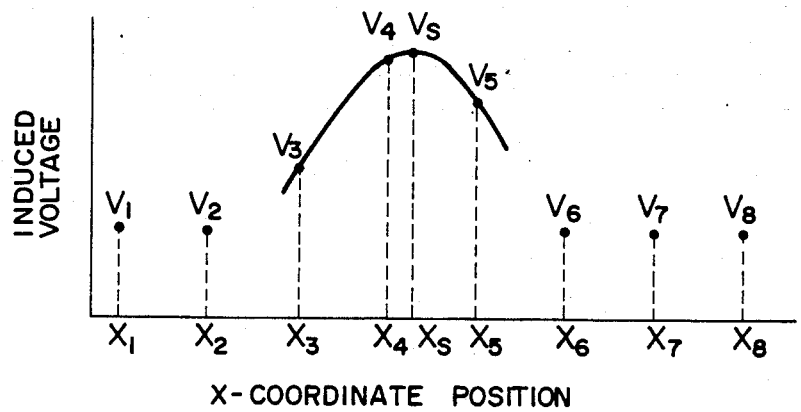
FIG. 6 is a graph showing one example of the induced voltage produced in each of the detecting lines for the X-direction.
Figure 7:
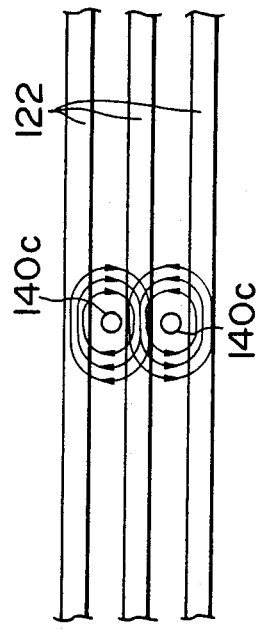
FIG. 7 shows the magnetic flux produced around each of the exciting lines.

At this time, induced voltages $V_1$ to $V_8$ shown in FIG. 6 are produced in the respective detecting lines 150a to 150h for the X-direction. In the graph shown in FIG. 6, the axis of abscissa represents coordinate positions $x_1$ to $x_8$ in the X-direction which correspond to the respective positions of the detecting lines 150a to 150h, while the axis of ordinate represents the value of induced voltages. The largest (maximum) value among the voltages $V_1$ to $V_8$ is obtained directly below the position A. Since the voltages $V_1$ to $V_8$ can be obtained from the multiplexer 301, it is possible to obtain the X-coordinate value $x_s$ of the position of the bar magnet 400 by calculating an X-coordinate value at which the maximum induced voltage is obtained from these induced voltages by means of the position detecting circuit 500.

There may be various methods of calculating the coordinate value $x_s$. One of them is a method wherein the waveform in the vicinity of the maximum value shown in FIG. 6 is approximated by an appropriate function, and the coordinate corresponding to the maximum value of the function is obtained. For example, when the induced voltages from the coordinate $x_3$ to the coordinate $x_5$ are approximated by a quadratic function (shown by the solid line in FIG. 6), the following formulae are formed from the induced voltages in the detecting lines and the coordinate values thereof, where the spacing between each pair of adjacent detecting lines 150a to 150h is assumed to be $\Delta x$.

$$V_3 = a(x_3 - x_s)^2 + b \quad (1)$$

$$V_4 = a(x_4 - x_s)^2 + b \quad (2)$$

$$V_5 = a(x_5 - x_s)^2 + b \quad (3)$$

where a and b are constants (a<0)
Further, the following formulae hold:

$$x_4 - x_3 = \Delta x \quad (4)$$

$$x_5 - x_3 = 2\Delta x \quad (5)$$

The formulae (4) and (5) are substituted into the formulae (2) and (3), respectively, and the formulae (2) and (3) are rearranged to obtain the following formula:

$$x_s = x_3 + \Delta x/2\{(3V_3 - 4V_4 + V_5)/(V_3 - 2V_4 + V_5)\} \quad (6)$$

Accordingly, it is possible to obtain the X-coordinate value $x_s$ of the position of the bar magnet 400 by substituting the voltages $V_3$, $V_4$ and $V_5$ induced in the detecting lines 150c, 150d and 150e and the coordinate value $x_3$ (known) of the detecting line 150c into the formula (6) and calculating the same in the position detecting circuit 500. The same X-coordinate value is obtained when the bar magnet 400 is moved along the Y-axis.

Induced voltages similar to those shown in FIG. 6 are also obtained in the detecting lines 170a to 170h in the Y-direction, and it is possible to obtain a Y-coordinate value $y_s$ by carrying out calculations similar to the above.

It is to be noted that the magnetic sheets 120a, 120b, 120e and 120f in the tablet 100 are provided for the purpose of obtaining increased electromagnetic induction by constituting the path of magnetic flux produced around each exciting line by means of the magnetic elements 122 in the sheets; therefore, it is not always necessary to provide them. Further, since the shielding sheets 110a and 110b are provided for the purpose of preventing any external noise from entering the tablet 100 and also any noise from being induced in external devices, it is not always necessary to provide them.

The piling order of the sheets is not necessarily limited to that described above. For example, the piling order may be such that the magnetic sheet 120b, the conductor sheet 130b, the magnetic sheet 120d, the conductor sheet 130d and the magnetic sheet 120f are laid one upon the other in the mentioned order to thereby constitute an X-direction position detecting unit, while the magnetic sheet 120a, the conductor sheet 130a, the magnetic sheet 120c, the conductor sheet 130c and the magnetic sheet 120e are laid one upon the other in the mentioned order to thereby constitute a Y-direction position detecting unit, and these units are then laid one upon the other. It will be clear that it is possible to arrange a position detecting device for only one direction by employing either the X- or Y-direction position detecting unit.

Figure 8:
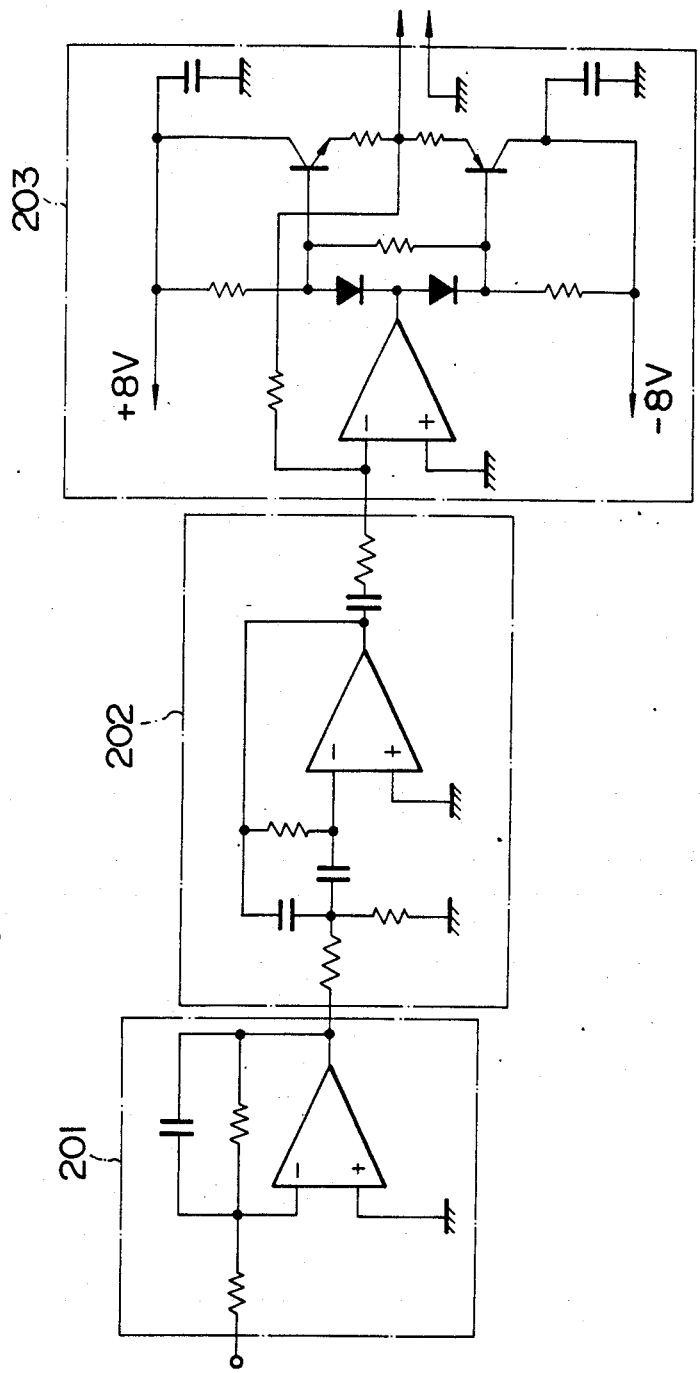
FIG. 8 is a circuit diagram of the driving current source in the first embodiment, which shows a practical arrangement thereof.

Referring next to FIG. 8 which shows a practical example of the driving current source 200, the reference numeral 201 denotes an integrating circuit which is supplied with, as an input signal, clock pulses (or pulses obtained by frequency-dividing the clock pulses) from a processing unit in the position detecting circuit 500, described later, and which integrates the input signal and converts the same to a triangular-wave signal. A band-pass filter 202 converts the triangular-wave signal into a sine-wave signal. A power driver 203 is composed of an operational amplifier and a current amplifier and is arranged such as to current-amplify the sine-wave and deliver the thus amplified signal to the exciting lines 140a to 140i and 160a to 160i. The reason why clock pulses are employed as the reference (input) signal is that it is necessary to obtain synchronism with the position detecting circuit 500.

Figure 9:
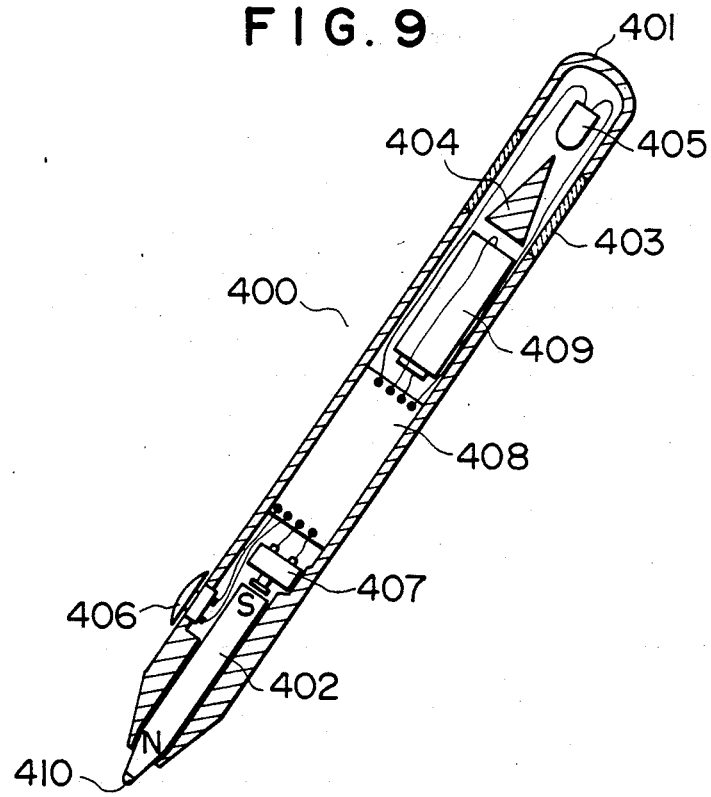
FIG. 9 is a sectional view of the position designating magnetic generator in the first embodiment, which shows a practical example thereof.
Figure 10:
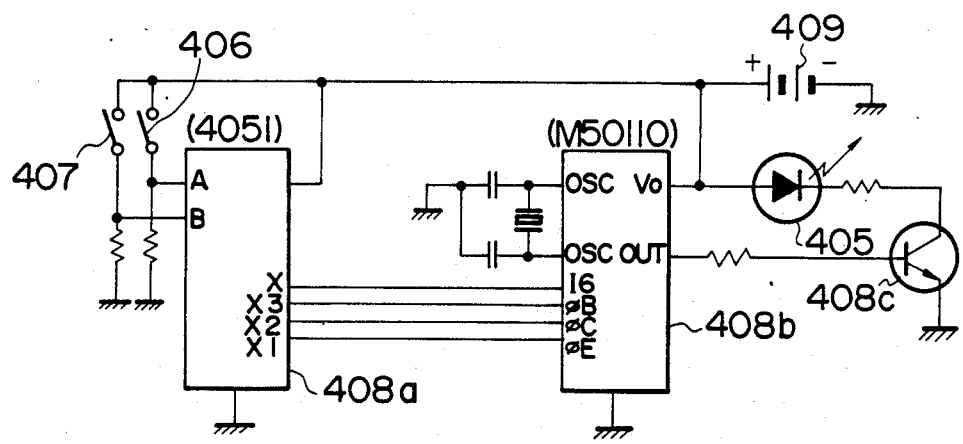
FIG. 10 is a diagram showing the electric circuit of the magnetic generator.

FIG. 9 is a sectional view of a practical example of the position designating magnetic generator 400, while FIG. 10 is a diagram showing the electric circuit of the magnetic generator 400. In FIG. 9, the reference numeral 401 denotes a pen-shaped container made of a synthetic resin or the like. A bar magnet 402 with a tapered tip is housed at one end of the container 401 so as to be slidable axially of the container 401. An infrared-transparent window 403 made of a transparent plastic or the like is circumferentially provided at the other end of the container 401. Inside the window 403 are accommodated a reflecting member 404 constituted by a conical member having its peripheral surface plated with chromium or the like and an infrared-emitting diode 405. A control switch 406 is mounted on one side of a portion of the container 401 closer to the distal end thereof, while a control switch 407 is mounted inside the container 401 so as to face the inner end of the bar magnet 402. A signal generating circuit 408 and a battery 409 are housed at appropriate positions inside the container 401. The signal generating circuit 408 converts a plurality (three, in this case) of commands given to the position detecting circuit 500, such as those for starting measurement and inputting a coordinate position, into a plurality of code signals constituted by combinations of some pulse signals, respectively. The signal generating circuit 408b has a decoder 408a, a code signal generator 408, and a diode driving transistor 408c and generates code signals in accordance with combinations of ON/OFF of the control switches 406 and 407 to drive the infrared-emitting diode 405. Thus, when the control switch 406 is turned ON, an infrared signal representing a code which indicates the start of measurement is transmitted from the diode 405 through the reflecting member 404 and the infrared-transparent window 403. When, in this state, the tip of the bar magnet 402 covered with a cover 410 is pressed against the input surface, the bar magnet 402 slides so as to turn ON the switch 407. Consequently there develops, an infrared signal representing a code signal which indicates the inputting of a position.

Figure 11:
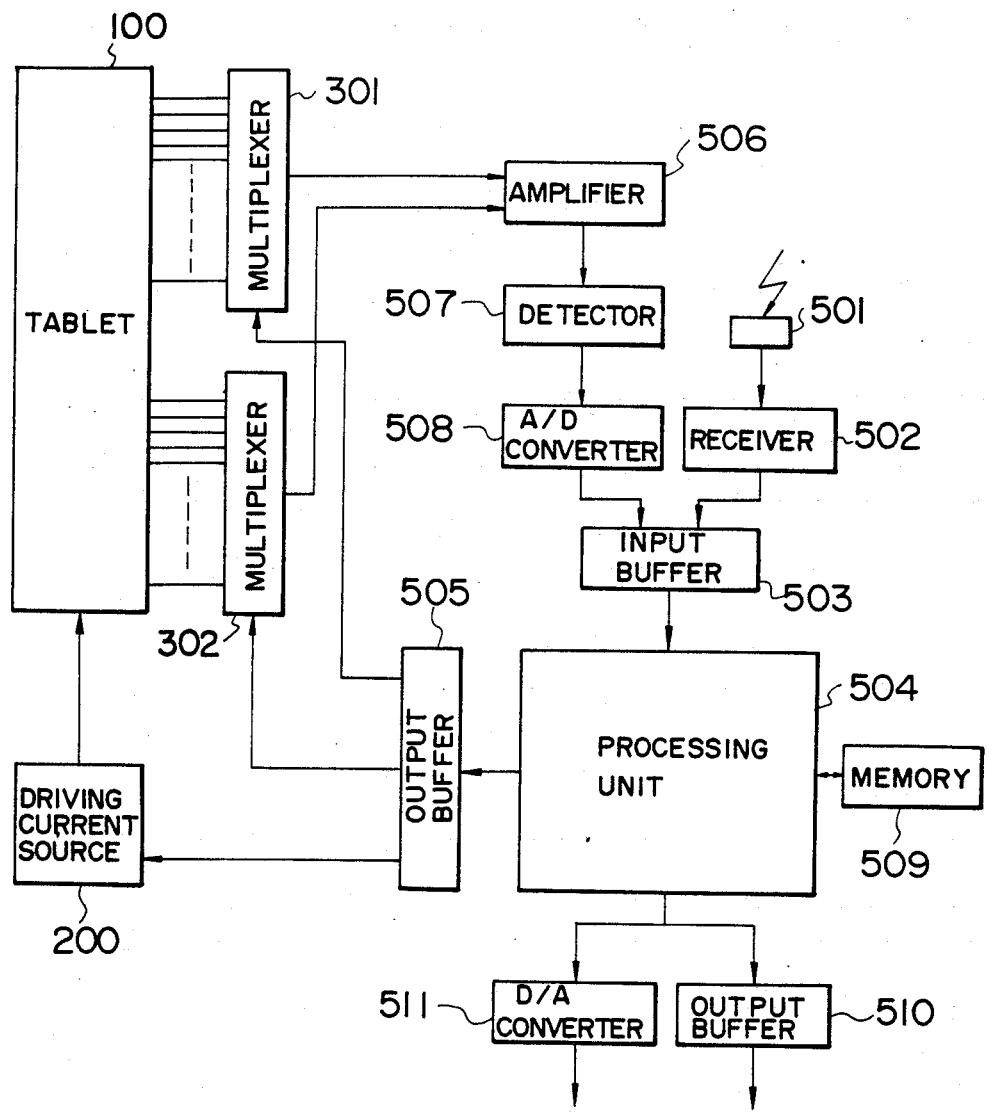
FIG. 11 is a circuit block diagram of the position detecting circuit, which shows a practical arrangement thereof.

FIG. 11 is a circuit block diagram of the position detecting circuit 500, which shows a practical arrangement thereof. Referring to FIG. 11, when an infrared signal representing the code which indicates the start of measurement is transmitted from the infrared-emitting diode 405 of the position designating magnetic generator 400, the infrared signal is received by an infrared-receiving diode 501 and is delivered to a receiver 502 where it is amplified, wave-shaped and converted into the previous code signal and is further returned to the measurement start command signal, which is then delivered to an input buffer 503. When a processing unit 504 recognizes the start of measurement by reading out the command signal from the input buffer 503, the unit 504 delivers a control signal to the multiplexer 301 through an output buffer 505 so that the respective induced voltages in the detecting lines 150a to 150h for the X-direction are successively input to an amplifier 506. Each of the induced voltages is amplified by the amplifier 506 and rectified by a detector 507 so as to be converted into a DC voltage, which is further converted into a digital value by an analog-to-digital (A/D) converter 508 and is then delivered to the processing unit 504 through the input buffer 503. In the processing unit 504, the induced voltages (digital values) are temporarily stored in a memory 509, and an induced voltage $V_k$ having the maximum voltage value among these induced voltages is detected. The processing unit 504 further takes out the induced voltages $V_k$ from the memory 509, together with the induced voltage $V_{k-1}$ which immediately precedes the voltage $V_k$ and the voltage $V_{k+1}$ which is immediately subsequent to the voltage $V_k$, and calculates the formula (6) with these voltages respectively employed as the voltages $V_3$, $V_4$ and $V_5$ in the formula (6), thereby obtaining an X-coordinate value.

Next, the processing unit 504 delivers a control signal to the multiplexer 302 through the output buffer 505 so that the respective induced voltages in the detecting lines 170a to 170h for the Y-direction are successively input to the processing unit 504, and the unit 504 obtains a Y-coordinate value by carrying out a processing operation similar to that described above.

The thus obtained X- and Y-coordinate values, which are respectively represented by digital values, are temporarily stored in the memory 509, and they are renewed as a result of the above measurement and calculation repeated at predetermined regular intervals while the signal indicating the start of measurement is available. Next, an infrared signal representing a code which indicates the inputting of a position is transmitted from the position designating magnetic generator 400. When this is recognized by the processing unit 504 through the infrared-emitting diode 501, the receiver 502 and the input buffer 503, the above X- and Y-digital coordinate values are delivered, as input values, through the output buffer 510 to a digital display (not shown) so as to be displayed, or to a computer (not shown) where they are properly processed, or the values are converted into analog values through a digital-to-analog (D/A) converter 511 so as to be subjected to necessary processing.

It is to be noted that the number of the magnetic elements, exciting lines and detecting lines described in the embodiment is only an example and is, as a matter of course, not necessarily limitative thereto. It has experimentally been confirmed that position detection can be effected with relatively high accuracy when the spacing between each pair of adjacent detecting lines is about 2 to 6 mm. In addition, the position designating magnetic generator is not necessarily limited to a bar magnet and may be a magnet in the form of a plate, ring or rectangular parallelepiped, or an electromagnet.

Figure 12:
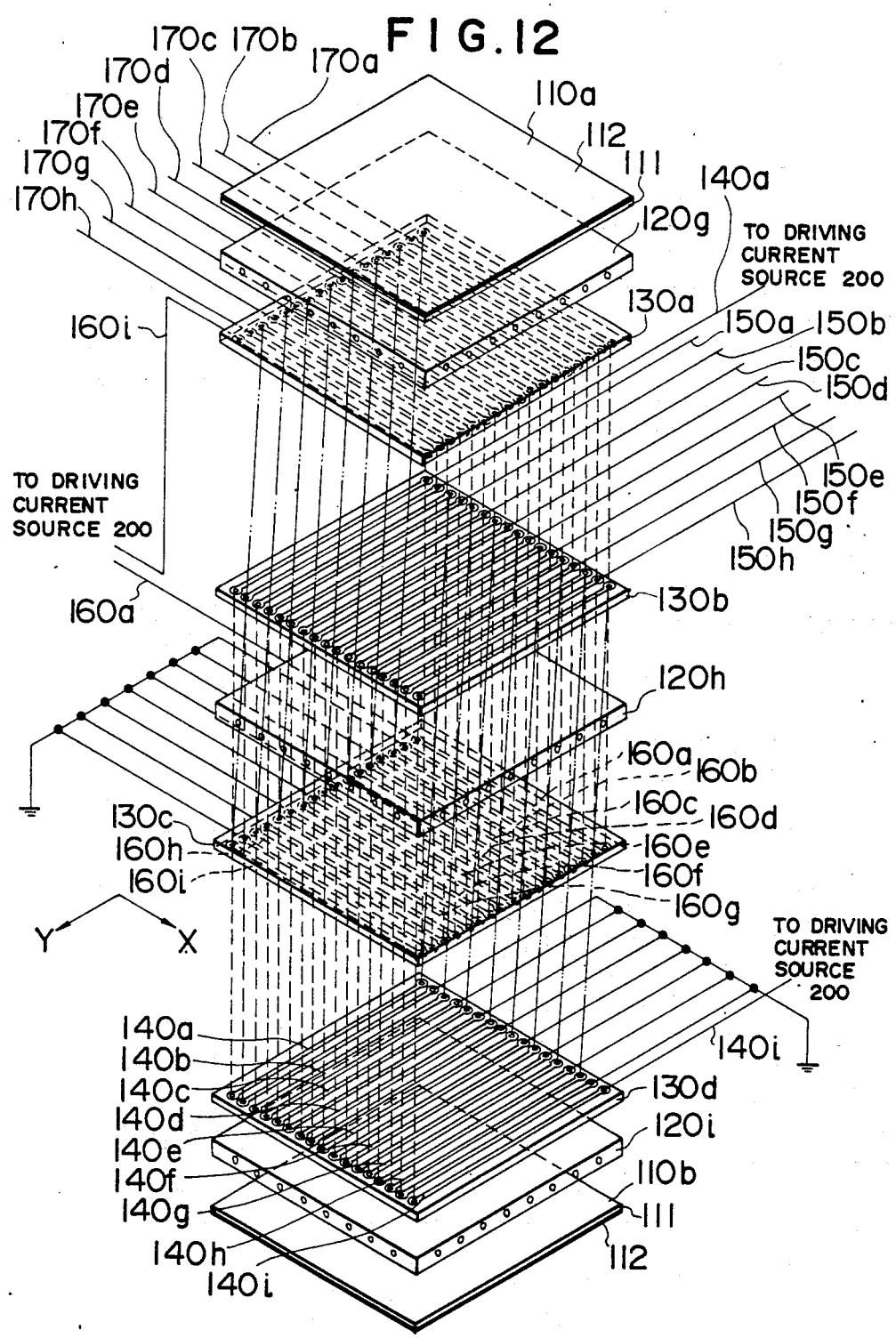
FIG. 12 shows the tablet of a position detecting device in accordance with a second embodiment of the present invention.

FIG. 12 shows the tablet 100 of a position detecting device in accordance with a second embodiment of the present invention. This tablet 100 is composed of nine layers which are respectively constituted by a shielding sheet 110a, a magnetic sheet 120g, conductor sheets 130a, 130b, a magnetic sheet 120h, conductor sheets 130c, 130d, a magnetic sheet 120i and a shielding sheet 110b these layers being disposed in that order from the upper side to the lower side thereof.

Each of the magnetic sheets 120g to 120i is, as shown in FIG. 13, formed by weaving a group of warp elements (or weft elements) 123 and a group of weft elements (or warp elements) 126 into a plain weave fabric, and hardening this fabric into a sheet-like configuration by means of an insulating resin such as an epoxy resin. The group of warp elements 123 consists of a multiplicity of insulating fibers 121 disposed such as to extend substantially parallel to each other, and a plurality of relatively long magnetic elements 122a disposed among the insulating fibers 121 at predetermined regular spacings, while the group of weft elements 126 consists of a multiplicity of insulating fibers 124 disposed such as to extend substantially parallel to each other, and a plurality of relatively long magnetic elements 122b disposed among the insulating fibers 124.

Each pair of adjacent sheets is bonded by means of an adhesive sheet as described with respect to the first embodiment. In this case, the magnetic elements 122a of the magnetic sheets 120g to 120i are disposed such as to extend in the Y-direction, and the magnetic elements 122b in the X-direction. The conductor elements of the conductor sheets 130a and 130c are disposed such as to extend in a direction orthogonal to the Y-direction, and the conductor elements of the conductor sheets 130b and 130d in a direction orthogonal to the X-direction.

Another tablet-manufacturing method may be employed wherein printed boards are respectively bonded to the outer sides of each of the magnetic sheets and, thereafter, conductor elements are formed on the printed boards by etching, thereby producing a set of the conductor sheet 130b, the magnetic sheet 120b and the conductor sheet 130c. Conductor elements are formed on only one of the two printed boards, thereby producing a set of the shielding sheet 110a, the magnetic sheet 120a and the conductor sheet 130a; and a set of the conductor sheet 130d, the magnetic sheet 120c and the shielding sheet 110b. Then, these sets are bonded together.

The conductor sheets 130b and 130d are disposed such that the conductor elements of the sheet 130b and those of the sheet 130d respectively coincide with each other vertically, and each pair of corresponding conductor elements is connected together at land holes each provided at one end of each conductor by means of through-hole contact, thereby alternately forming exciting lines 140a to 140i and detecting lines 150a to 150h for the X-direction which wind around the magnetic elements 122b in the magnetic sheet 120h. The other end of each of the exciting lines 140a to 140i on the conductor sheet 130b is connected to the other end of the adjacent one of the exciting lines 140a to 140i on the conductor sheet 130d, that is, the exciting lines 140a to 140i are connected in series. The other or second end of the exciting lines 140a and that of the exciting line 140i are connected to the driving current source 200. The other end of each of the detecting lines 150a to 150h on the conductor sheet 130b is connected to the multiplexer 301, while the other end of each of the detecting lines 150a to 150h on the conductor sheet 130d is grounded in common.

The conductor sheets 130a and 130c are disposed such that the conductor elements of the sheet 130a and those of the sheet 130c respectively coincide with each other vertically, and each pair of corresponding conductor elements are connected together at land holes each provided at one end of each conductor by means of through-hole contact, thereby alternately forming exciting lines 160a to 160i and detecting lines 170a to 170h for the Y-direction which wind around the magnetic elements 122a in the magnetic sheet 120h. The other end of each of the exciting lines 160a to 160i on the conductor sheet 130a is connected to the other end of the adjacent one of the exciting lines 160a to 160i on the conductor sheet 130c, that is, the exciting lines 160a to 160i are connected in series. The other or second end of the exciting line 160a and that of the exciting line 160i are connected to the driving current source 200. The other end of each of the detecting lines 170a to 170h on the conductor sheet 130a is connected to the multiplexer 302, while the other end of each of the detecting lines 170a to 170h on the conductor sheet 130c is grounded.

The arrangement of the other portions in this embodiment is the same as that in the first embodiment. It is possible according to this embodiment to make the thickness of the tablet 100 smaller than that of the first embodiment.

Figure 14:
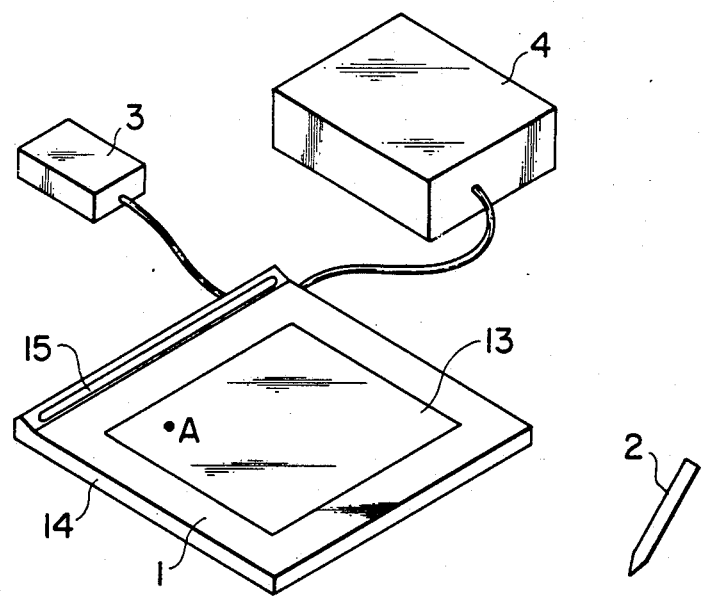
FIG. 14 is a perspective view of one embodiment of a coordinate input device with a display.

Referring next to FIG. 14 which schematically shows one embodiment of the coordinate input device with a display according to the present invention, the reference numeral 1 denotes an input/output panel, 2 a position designating magnetic generator (input pen), 3 a power unit, and 4 a controller.

Figure 15:
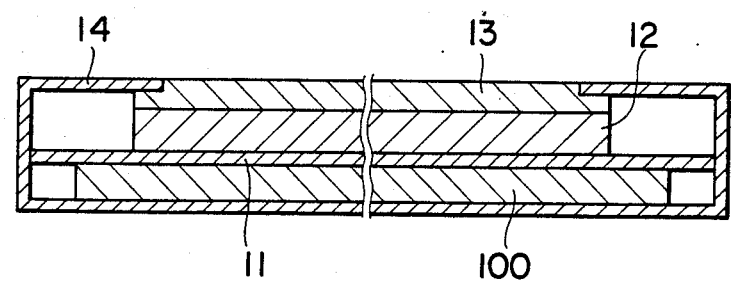
FIG. 15 is a partially-omitted enlarged sectional view of the input/output panel in this embodiment.

The input/output panel 1 is, as shown in FIG. 15, composed of a tablet 100, a back light 12 and a liquid-crystal display (display panel) 13. Back light 12 and display panel 13 are placed on the tablet 100 through a shielding plate 11, these members being housed within a casing 14 all together in one unit. An infrared-transparent window 15 is provided in the rear portion of the casing 14, and an infrared-emitting diode (described later) is provided inside the window 15.

The tablet 100 is, as shown in FIG. 2, composed of twelve layers which are respectively constituted by a shielding sheet 110a, magnetic sheets 120a, 120b, conductor sheets 130a, 130b, magnetic sheets 120c, 120d, conductor sheets 130c, 130d, magnetic sheets 120e, 120f, and a shielding sheet 110b, these layers being disposed in that order from the upper side to the lower side thereof.

Each of the shielding sheets 110a and 110b is constituted by a printed board formed by bonding a copper sheet 112 to one surface of an insulating substrate 111 made of, for example, a glass epoxy resin.

Figure 16:
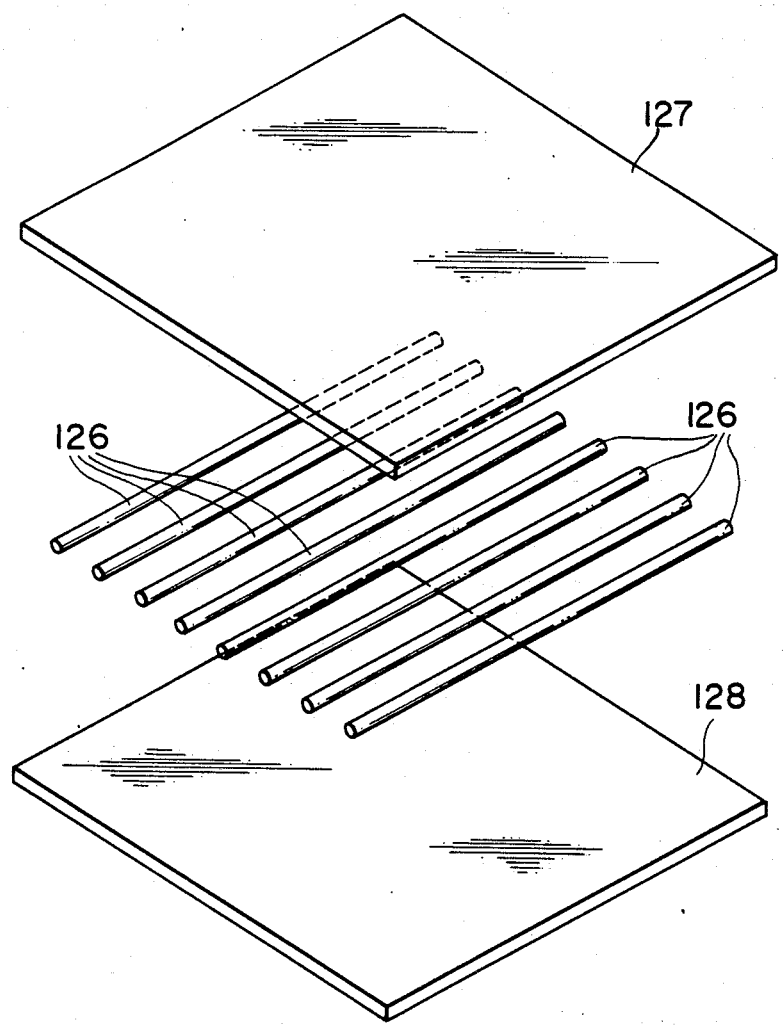
FIG. 16 shows one of the magnetic sheets in this embodiment.

Each of the magnetic sheets 120a to 120f is, as shown in FIG. 16, formed by disposing a plurality (eight, in the illustrated example) of relatively long magnetic elements 126 substantially parallel to each other, clamping these magnetic elements 126 between two insulating substrates 127, 128 made of, for example, a glass epoxy resin, and integrating them together by means, for example, of heat contact bonding.

The arrangement of the other portions of the tablet 100 is similar to that of the above embodiments.

The shielding plate 11 may be constituted by a metallic plate made of a non-magnetic metal, e.g., aluminum or copper, or a synthetic resin plate material having a non-magnetic metal deposited on the surface thereof by evaporation.

The back light 12 may, for example, be constituted by a known illuminator which utilizes electroluminescence (EL) (field emission) and in which a fluorescent layer which is formed by dispersing a fluorescent powder into a medium with a high dielectric constant is interposed between a transparent planar electrode and a back electrode, and an AC voltage is applied between the electrodes to emit light. The AC voltage is supplied from the power unit 3.

As the liquid-crystal display 13, a known matrix-type liquid-crystal display cell may, for example, be employed in which a liquid crystal medium is interposed between a plurality of horizontal and vertical electrodes disposed orthogonally with respect to each other. The drive control of the display 13 will be described later.

It is to be noted that, as the input pen 2, one such as that shown in FIGS. 9 and 10 may be used, FIG. 9 being a sectional view thereof, and FIG. 10 being a diagram showing the electric circuit thereof.

Figure 17:
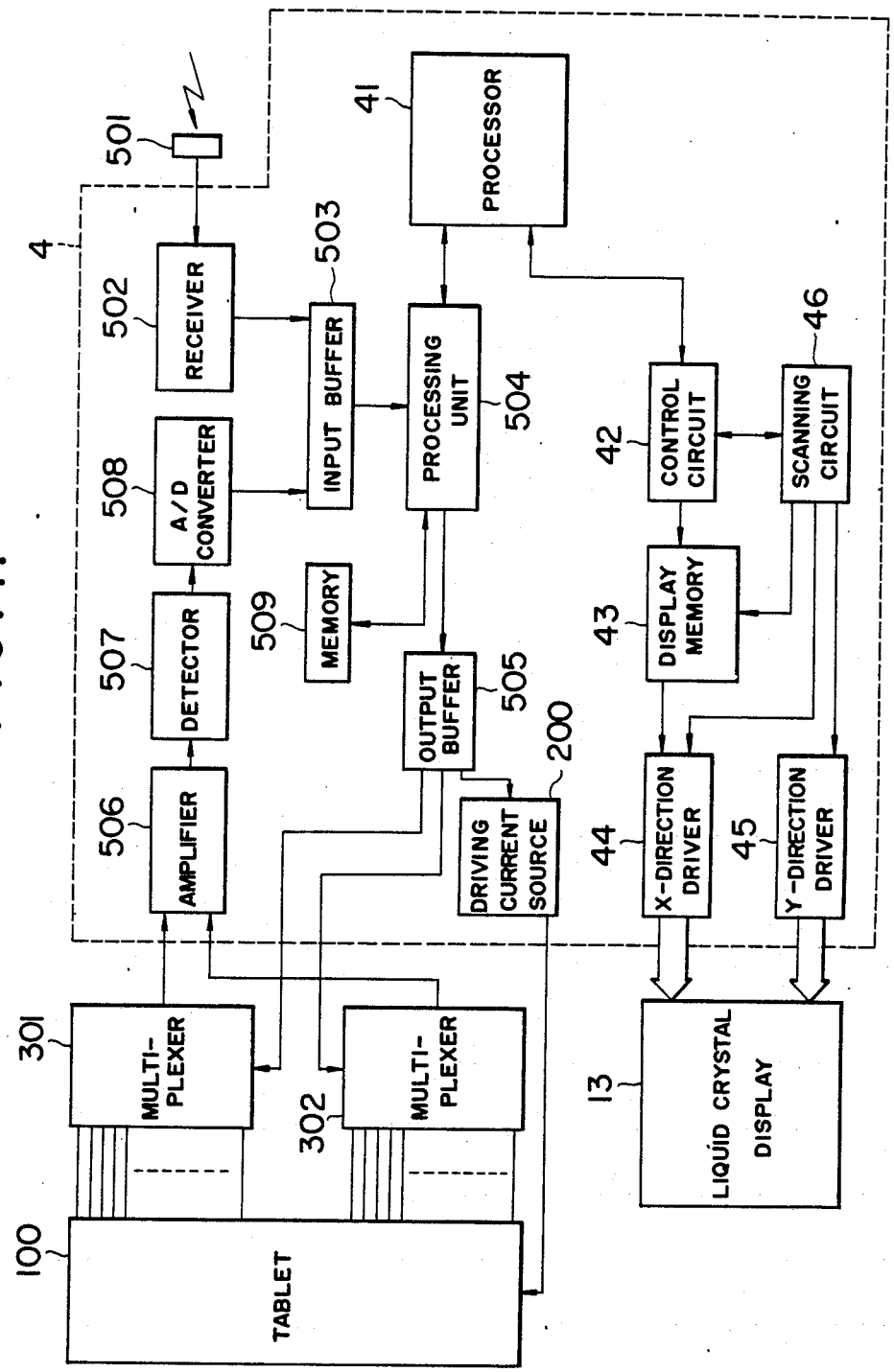
FIG. 17 is a circuit block diagram of an essential portion of the device.

FIG. 17 is a circuit block diagram of the controller 4, which shows a practical arrangement thereof. The same constituent members or portions shown in FIG. 17 as those in the above-described embodiments are denoted by the same reference numerals. The operation of the device will be described below in detail by way of explanation of each circuit block.

When the power supply for the controller 4 is turned ON, a sine-wave alternating current is supplied to the exciting lines 140a to 140i and 160a to 160i in the tablet 100 from the driving current source 200. At this time, the detecting lines 150a to 150h and 170a to 170h have an induced voltage produced therein by electromagnetic induction caused by the alternating current flowing through the exciting lines 140a to 140i and 160a to 160i. Since this electromagnetic induction takes place through the magnetic elements 126 in the magnetic sheets 120a to 120f, the larger the magnetic permeability of the magnetic elements 126, the larger the value of the induced voltage. The magnetic permeability of the magnetic elements 126 greatly varies in accordance with the magnitude of the magnetic bias externally applied thereto. The degree by which the magnetic permeability changes differs depending upon the composition of the magnetic material employed for the magnetic elements 126, the frequency of the above-described alternating current, and whether or not a heat treatment is applied to the magnetic material. It is therefore possible to set the magnetic permeability so that it reaches its maximum when a predetermined magnetic bias is applied, as shown in FIG. 5. Accordingly, the application of the predetermined magnetic bias to the magnetic elements 126 in this case increases the voltage induced in the detecting lines 150a to 150h and 170a to 170h by the alternating current flowing through the exciting lines 140a to 140i and 160a to 160i.

It is now assumed that, in FIG. 14, the tip of the bar magnet 402 of the input pen 2 is pressed against the input surface (the upper surface of the liquid-crystal display panel 13, in this case) at a position which is a distance $x_s$ away from the detecting line 150a in the X-direction and which is a distance $y_s$ away from the detecting 170a in the Y-direction, and the predetermined magnetic bias is thereby applied to the magnetic elements 126.

At this time, induced voltages $V_1$ to $V_8$ shown in FIG. 6 are produced in the respective detecting lines 150a to 150h for the X-direction. In the graph shown in FIG. 6, the axis of the abscissa represents coordinate positions $x_1$ to $x_8$ in the X-direction which correspond to the respective positions of the detecting lines 150a to 150h, while the axis of the ordinate represents the value of induced voltages. The largest (maximum) value among the voltages $V_1$ to $V_8$ is obtained directly below the position A.

When the switch 406 of the input pen 2 is turned ON, an infrared signal representing a code which indicates the start of measurement is transmitted from the infra-red-emitting diode 405. The infrared signal is received by the infrared-receiving diode 501 provided inside the infrared-transparent window 15 of the input/output panel 1. The infrared signal is further delivered to the receiver 502 where it is amplified, wave-shaped and converted into the previous code signal and is further returned to the measurement start command signal, which is then delivered to the input buffer 503. When the processing unit 504 recognizes the start of measurement by reading out the measurement start command signal from the input buffer 503, the unit 504 delivers a control signal to the multiplexer 301 through the output buffer 505 so that the respective induced voltages in the detecting lines 150a to 150h for the X-direction are successively input to the amplifier 506. Each of the induced voltages is amplified by the amplifier 506 and rectified by the detector 507 so as to be converted into a DC voltage, which is further converted into a digital value by the analog-to-digital (A/D) converter 508 and is then delivered to the processing unit 504 through the input buffer 503. In the processing unit 504, the induced voltages (digital values) are temporarily stored in the memory 509, and a coordinate value $x_s$ of the position A in the X-direction is obtained from these induced voltages.

The coordinate value $x_s$ may be calculated by a method similar to that described above.

More specifically, the processing unit 504 first detects an induced voltage $V_k$ having the maximum value (the largest voltage value, in this case) among the above induced voltages. The processing unit 504 then takes out the induced voltage $V_k$ from the memory 509, together with the induced voltage $V_{k-1}$ which immediately precedes the voltage $V_k$ and the voltage $V_{k+1}$ which is immediately subsequent to the voltage $V_k$, and calculates the formula (6) with these voltages respectively employed as the voltages $V_3$, $V_4$ and $V_5$ in the formula (6), thereby obtaining the X-coordinate value $x_s$.

Next, the processing unit 504 delivers a control signal to the multiplexer 302 through the output buffer 503 so that the respective induced voltages in the detecting lines 170a to 170h for the Y-direction are successively input to the processing unit 504, and the unit 504 obtains a Y-coordinate value by carrying out a processing operation similar to the above.

The thus obtained X- and Y-coordinate values, which are respectively represented by digital values, are temporarily stored in the memory 509, and they are renewed as a result of the above measurement and calculation repeated at predetermined regular intervals while the signal indicating the start of measurement is available. Then, when the tip of the input pen 2 is strongly pressed against the input surface so that the switch 407 is turned ON, an infrared signal representing a code which indicates the inputting of a position is transmitted from the infrared-emitting diode 405. When this is recognized by the processing unit 504 through the infrared-receiving diode 501, the receiver 502 and the input buffer 503, the above X- and Y-digital coordinate values at that time are delivered to a processor 41 as input values. Thereafter, this operation is repeated, whereby data about positions successively designated can be obtained.

The position data composed of coordinate values in the X- and Y-directions and delivered to the processor 41 are successively delivered through a display control circuit 42 to a display memory 43 where the position data are arranged in accordance with a predetermined order and stored. The position data are successively read out in response to timing pulses delivered from the display control circuit 42 and are output to an X-direction driver 44 and a Y-direction driver 45. The X- and Y-direction drivers 44 and 45 are further supplied with, as inputs, scanning pulses generated by a scanning circuit 46 in synchronism with the above-described timing pulses so that the drivers 44 and 45 drive the electrodes of the display 13 which correspond to the coordinate values in the X- and Y-directions, whereby the position designated on the tablet 100 is displayed at the same position on the display panel 13. Accordingly, a character or figure handwritten with the input pen 2 from the upper side of the input/output panel 1 is displayed on the display panel 13 as it is by means of light. If, at this time, the back light 12 is simultaneously activated, it is possible to obtain a clear display even when the surrounding area is relatively dark. In addition, the shielding plate 11 enables any noise to be shut off, which prevents lowering of the degree of accuracy in position detection.

If the processor 41 is additionally given a character editing function, it is possible to effect correction, addition and deletion of a character or the like which has already been input. Further, if a figure processing function is additionally given to the processor 41, it is possible to utilize CAD, CAM and the like. In addition, the device can be used as a menu input device. It is to be noted that the above position data or the like can be sent to a known plotter or printer through the processor 41 to obtain a hard copy.

The magnetic sheets in this coordinate input device may be constituted by those shown in the aforementioned first and second embodiments. Further, the structure of the tablet 100 is not necessarily limited to that described above, and other types of structure may be employed, provided that the structure employed is able to satisfy the functional requirements of the device.

What is claimed is:

1. A position detecting device comprising:
    a tablet having a magnetic sheet formed by weaving a group of warp elements (or weft elements) composed of a multiplicity of insulating fibers and a plurality of relatively long magnetic elements disposed among said insulting fibers at predetermined regular spacings and a group of weft elements (or weft elements) composed of a multiplicity of insulating fibers into a plain weave fabric, this fabric being hardened into a sheet-like configuration by means of an insulating resin, and two conductor sheets each having a plurality of linear conductor elements formed thereon so as to extend substantially parallel to each other, said two conductor sheets being respectively overlaid on the upper and lower sides of said magnetic sheet so that said conductor elements and said magnetic elements extend orthogonally with respect to each other, and the corresponding conductor elements of the upper and lower conductor sheets being connected to each other, thereby alternately forming exciting lines and detecting lines;
    a driving current source for supplying said exciting lines with an alternating current of a predetermined cycle;
    a position designating magnetic generator for generating a stationary magnetic field; and
    a position detecting circuit for obtaining voltages respectively induced in said detecting lines and calculating, from these induced voltages, coordinate values of a position designated by said position designating magnetic generator.

2. A position detecting device according to claim 1, further comprising another magnetic sheet disposed on each of the outer sides of said conductor sheets so that its magnetic elements extend parallel to the magnetic elements of said magnetic sheet interposed between said conductor sheets.

3. A position detecting device according to claim 2, further comprising a shielding sheet made of a non-magnetic metal and disposed on the outer side of said another magnetic sheet.

4. A position detecting device according to claim 1, further comprising a shielding sheet made of a non-magnetic metal and disposed on each of the outer sides of said conductor sheets.

5. A position detecting device comprising:
    a tablet having two magnetic sheets each formed by weaving a group of warp elements (or weft elements) composed of a multiplicity of insulating fibers and a plurality of relatively long magnetic elements disposed among said insulating fibers at predetermined regular spacings and a group of weft elements (or warp elements) composed of a multiplicity of insulating fibers into a plain weave fabric, this fabric being hardened into a sheet-like configuration by means of an insulating resin, and four conductor sheets each having a plurality of linear conductor elements formed thereon so as to extend substantially parallel to each other, said two magnetic sheets being disposed such that the magnetic elements of one of them extend in a direction X, while the magnetic elements of the other extend in a direction Y, two of said four conductor sheets being respectively disposed on the upper and lower sides of the magnetic sheet the magnetic elements of which extend in the X direction so that the respective conductor elements thereof extend orthogonally with respect to the X direction, the other two of said four conductor sheets being respectively disposed on the upper and lower sides of the magnetic sheet the magnetic elements of which extend in the Y direction so that the respective conductor elements thereof extend orthogonally with respect to the Y direction, and the corresponding conductor elements, extending in the same direction, of each pair of upper and lower conductor sheets being connected together, thereby alternately forming exciting lines and detecting lines for the X direction and exciting lines and detecting lines for the Y direction;
    a driving current source for supplying said exciting lines for the X and Y directions with an alternating current of a predetermined cycle;
    a position designating magnetic generator for generating a stationary magnetic field; and
    a position detecting circuit for obtaining voltages respectively induced in said detecting lines for the X and Y directions and calculating coordinate values of a position designated by said position designating magnetic generator from these induced voltages.

6. A position detecting device according to claim 5, further comprising four other magnetic sheets, two of them being respectively disposed on the outer sides of said conductor sheets the conductor elements of which extend orthogonally with respect to the X direction such that their magnetic elements extend in the X direction, and the other two of said four magnetic sheets being respectively disposed on the outer sides of said conductor sheets the conductor elements of which extend orthogonally with respect to the Y direction such that their magnetic elements extend in the Y direction.

7. A position detecting device according to claim 6, further comprising a shielding sheet made of a non-magnetic metal and disposed on each of the outer sides of the uppermost and lowermost magnetic sheets of said four other magnetic sheets.

8. A position detecting device according to claim 5, further comprising a shielding sheet made of a non-magnetic metal and disposed on each of the outer sides of the uppermost and lowermost conductor sheets of said four conductor sheets.

9. A position detecting device comprising:
a tablet having a magnetic sheet formed by weaving a group of warp elements (or weft elements) composed of a multiplicity of insulating fibers and a plurality of relatively long magnetic elements disposed among said insulating fibers at predetermined regular spacings and a group of weft elements (or warp elements) having an arrangement similar to that of said group of warp elements (or weft elements) into a plain weave fabric, this fabric being hardened into a sheet-like configuration by means of an insulating resin, and four conductor sheets each having a plurality of linear conductor elements formed thereon so as to extend substantially parallel to each other, said magnetic sheet being disposed such that the magnetic elements in either said group of warp elements or said group of weft elements extend in a direction X, while those in the other of the two extend in a direction Y, said four conductor sheets being laid on the upper and lower sides of said magnetic sheet in pairs, respectively, such that the conductor elements of one of each pair of conductor sheets extend in the X direction, while the conductor elements of the other extend in the Y direction, and the corresponding conductor elements of the conductor sheets which extend in the same direction being connected together, thereby alternately forming exciting lines and detecting lines for the X direction and exciting lines and detecting lines for the Y direction;
a driving current source for supplying said exciting lines for the X and Y directions with an alternating current of a predetermined cycle;
a position designating magnetic generator for generating a stationary magnetic field, and
a position detecting circuit for obtaining voltages respectively induced in said detecting lines in the X and Y directions and calculating coordinate values of a position designated by said position designating magnetic generator from these induced voltages.

10. A position detecting device according to claim 9, further comprising another magnetic sheet disposed on each of the outer sides of the uppermost and lowermost conductor sheets of said four conductor sheets such that the magnetic elements in either said group of warp elements or said group of weft elements extend in the X direction, while those in the other of the two extend in the Y direction.

11. A position detecting device according to claim 9, further comprising a shielding sheet made of a non-magnetic metal and disposed on each of the outer sides of the uppermost and lowermost conductor sheets of said four.

12. A position detecting device according to claim 10, further comprising a shielding sheet made of a non-magnetic metal and disposed on the outer side of said another magnetic sheet.

13. In a position detecting device for detecting a position on a tablet designated by a position designating magnetic generator, the magnetic generator generating a stationary magnetic field, the detecting device comprising:
a coordinate input device with a display, the input device including a back light and a liquid crystal display, the back light and the liquid crystal display superposing over the tablet through a shielding plate made of a non-magnetic metal, the back light being interposed between the liquid crystal display and the shielding plate.

* * * * *

UNITED STATES PATENT AND TRADEMARK OFFICE
CERTIFICATE OF CORRECTION

PATENT NO. : 4,704,501

DATED : November 3, 1987

INVENTOR(S) : Yoshinori Taguchi, et al.

It is certified that error appears in the above-identified patent and that said Letters Patent is hereby corrected as shown below:

In the Abstract, line 19, change "from" to --form--.

In the Abstract, line 22, delete "designating" (both occurrences).

In the Abstract, line 24, after "detecting" insert --circuit--.

Column 2, line 23, change "massproduced" to --mass produced--.

Column 2, line 56, after "Each includes" insert --a plurality of--.

Column 3, line 25, delete "and".

Column 5, line 31, after "fibers" delete "may".

Column 9, line 38, change "408b" to --408--.

Column 9, line 39, change "408" to --408b--.

Column 9, line 50, insert a comma after "Consequently" and delete the comma after "develops".

Column 11, line 58, delete "in common".

Column 13, line 53, after "detecting" insert --line--.

Column 14, line 31, change "takes" to --reads--.

Column 15, line 46, change "insulting" to --insulating--.

UNITED STATES PATENT AND TRADEMARK OFFICE
CERTIFICATE OF CORRECTION

PATENT NO. :   4,704,501

DATED      :   November 3, 1987

INVENTOR(S) :  Yoshinori Taguchi, et al

It is certified that error appears in the above-identified patent and that said Letters Patent is hereby corrected as shown below:

Column 15, line 48, change "weft" to --warp--.

Signed and Sealed this

Eighteenth Day of April, 1989

Attest:

Attesting Officer

DONALD J. QUIGG

Commissioner of Patents and Trademarks